(12) United States Patent
Liu (10) Patent No.: US 11,599,209 B2
(45) Date of Patent: Mar. 7, 2023

(54) TOUCHPAD MODULE WITH FIRST AND SECOND FIXED POINTS AS FULCRUMS AND COMPUTING DEVICE USING SAME

(71) Applicant: Primax Electronics Ltd., Taipei (TW)

(72) Inventor: Hsin-Chih Liu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/701,389

(22) Filed: Mar. 22, 2022

(65) Prior Publication Data

US 2022/0374094 A1    Nov. 24, 2022

(30) Foreign Application Priority Data

May 24, 2021 (TW) ................................. 110118658

(51) Int. Cl.
G06F 3/0354 (2013.01)
G06F 1/16 (2006.01)
G06F 3/02 (2006.01)

(52) U.S. Cl.
CPC .......... G06F 3/03547 (2013.01); G06F 1/169 (2013.01); G06F 3/0202 (2013.01)

(58) Field of Classification Search
CPC ............................ G06F 3/03547; G06F 1/169
See application file for complete search history.

(56) References Cited

U.S. PATENT DOCUMENTS

| | | | |
|---|---|---|---|
| 2001/0033268 A1* | 10/2001 | Jiang ................... | G06F 3/03547 345/173 |
| 2019/0243475 A1* | 8/2019 | Huang .................. | G06F 1/1681 |
| 2019/0391659 A1* | 12/2019 | Woolley ................. | G06F 3/016 |

\* cited by examiner

*Primary Examiner* — Chun-Nan Lin
(74) *Attorney, Agent, or Firm* — Kirton McConkie; Evan R. Witt (57) ABSTRACT

A touchpad module includes a base plate, a touch member and an elastic structure between the touch member and the base plate. The elastic structure includes a supporting frame and a swingable resilience piece. There are a first fixing point and a second fixing point between the swingable resilience piece and the base plate. The swingable resilience piece includes a first resilience arm and a second resilience arm. The first resilience arm is connected between the first fixing point and a first inner side of the supporting frame. The second resilience arm is connected between the second fixing point and a second inner side of the supporting frame. When an external force is exerted on a first end of the touch member, the first resilience arm is correspondingly swung toward the base plate by using the first fixed point as a fulcrum.

9 Claims, 8 Drawing Sheets

TOUCHPAD MODULE WITH FIRST AND SECOND FIXED POINTS AS FULCRUMS AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

Figure 1:
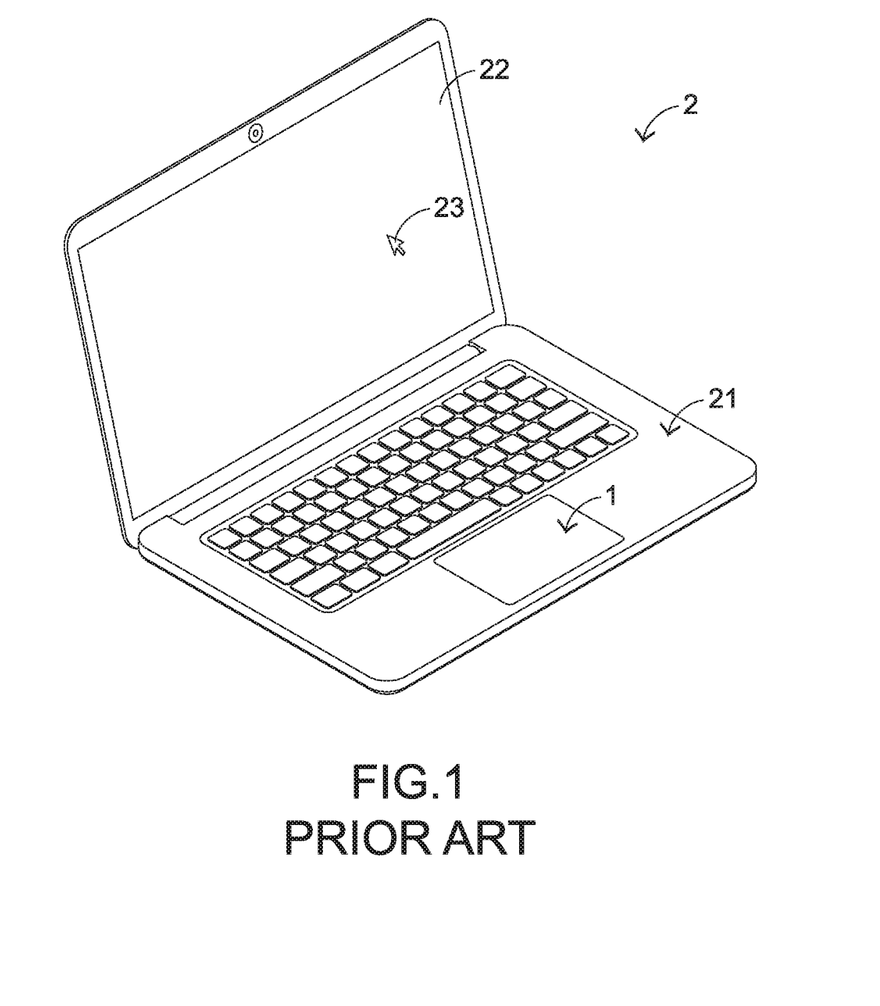
FIG. 1 schematically illustrates a conventional notebook computer with a touchpad module.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

Figure 2:
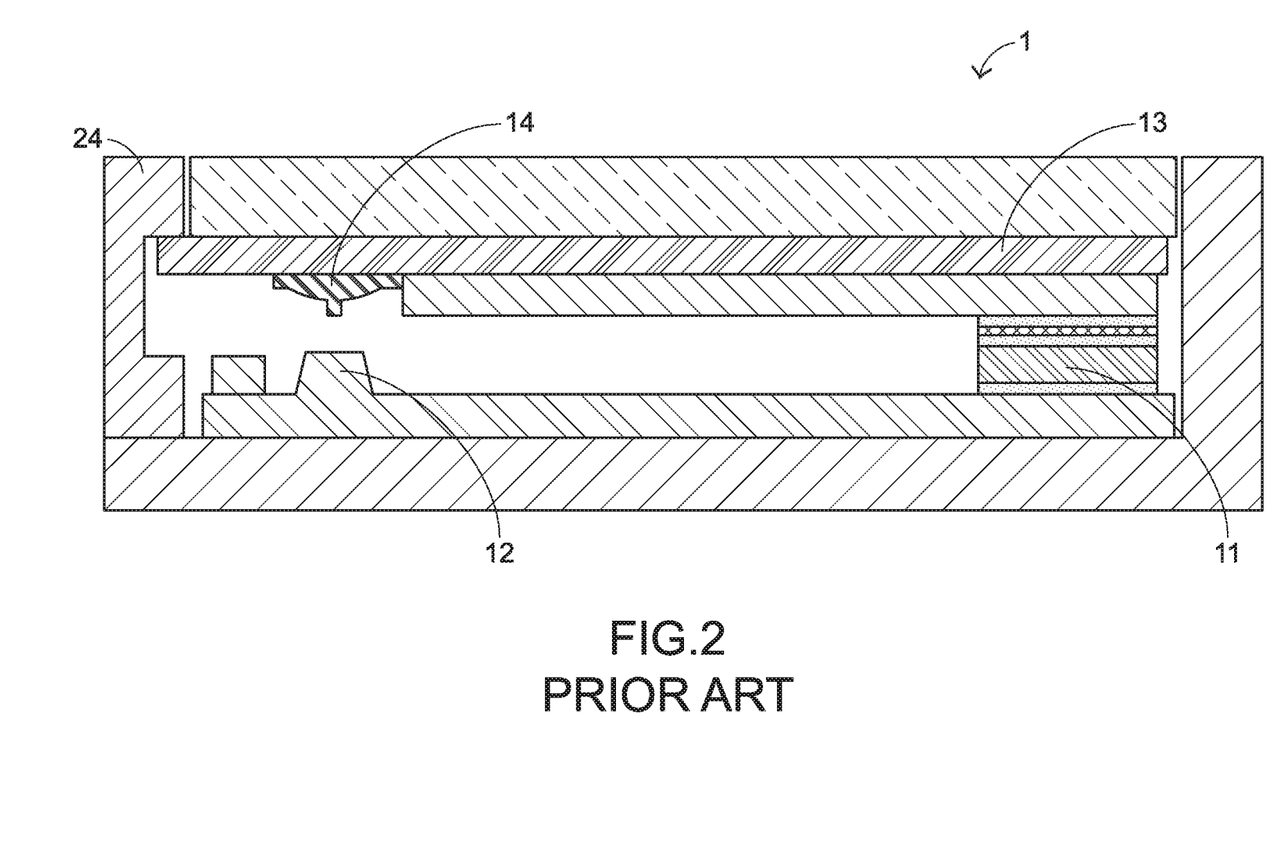
FIG. 2 is a schematic cross-sectional view illustrating the touchpad module as shown in FIG. 1, in which the touchpad module is not pressed down.
Figure 3:
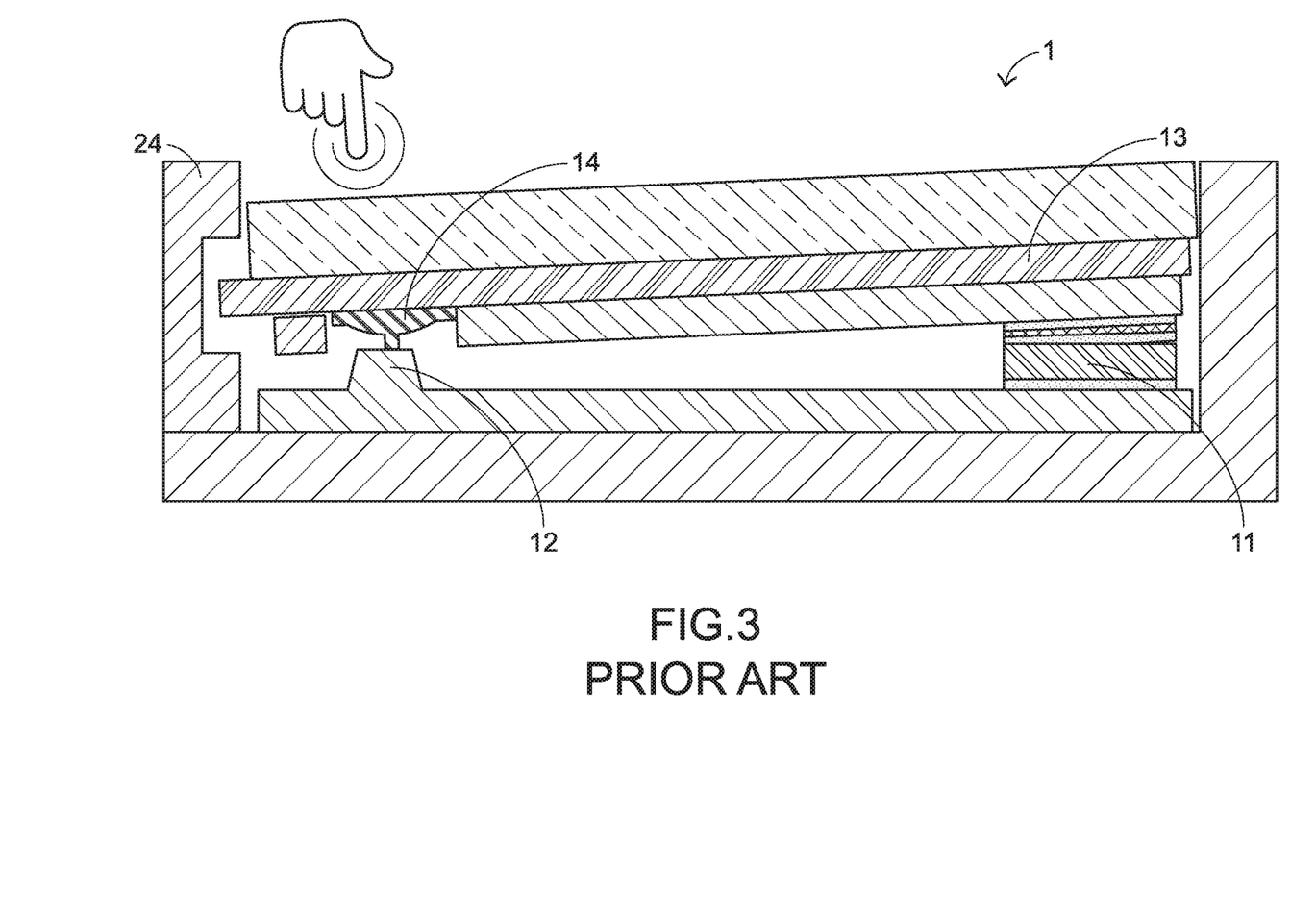
FIG. 3 is a schematic cross-sectional view illustrating the touchpad module as shown in FIG. 2, in which the touchpad module is pressed down.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. The touchpad module 1 is installed within the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 can be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

Generally, the supporting structure 11 is connected with the upper component and the lower component through iron elements or plastic structures (e.g., sponge structures). Consequently, as the iron elements or the plastic structures are subjected to deformation, the touch member 13 can be swung upwardly or downwardly. However, the conventional touchpad module 10 still has some drawbacks. For example, the region of the touch member 13 that is aligned with the supporting structure 11 cannot be pressed down, but only the region of the touch member 13 that is not aligned with the supporting structure 11 can be pressed down. In other words, the touch member 13 of the touchpad module 10 can be locally pressed down. Due to the structural design of the touchpad module 10, it is unable to press down the whole surface of the touch member 13.

Therefore, there is a need of providing an improved touchpad module in order to overcome the above drawbacks.

SUMMARY OF THE INVENTION

An object of the present invention provides a touchpad module. Due to the special design, the whole region of a touch member of the touchpad module can be pressed down. Consequently, the problem of locally pressing the touch member of the conventional touchpad module can be overcome.

The other objects and advantages of the present invention will be understood from the disclosed technical features.

In accordance with an aspect of the present invention, a touchpad module for a computing device is provided. The touchpad module is installed within a fixing frame of a computing device. The touchpad module includes a base plate, a touch member and an elastic structure. The base plate includes a triggering part. The touch member is located over the base plate. The touch member includes a switch corresponding to the triggering part. The elastic structure is arranged between the touch member and the base plate. The elastic structure includes a supporting frame and a swingable resilience piece. The swingable resilience piece is connected with the supporting frame. The touch member is supported by the supporting frame. The swingable resilience piece is fixed on the base plate. There are at least one first fixing point and at least one second fixing point between the swingable resilience piece and the base plate. The swingable resilience piece includes a first resilience arm and a second resilience arm. The first resilience arm is extended from the at least one first fixing point in a direction toward the supporting frame and connected with a first inner side of the supporting frame. The second resilience arm is extended from the at least one second fixing point in a direction toward the supporting frame and connected with a second inner side of the supporting frame. When an external force is exerted on a first region at a first side of the touch member, a first end of the touch member is swung toward the base plate, so that the switch is contacted with the triggering part. While the first end of the touch member is swung toward the base plate, the supporting frame is moved downwardly, and the first resilience arm is correspondingly swung toward the base plate by using the at least one first fixed point as a fulcrum.

In an embodiment, when the external force is exerted on a second region at a second side of the touch member, a second end of the touch member is swung toward the base plate, so that the switch is contacted with the triggering part. While the second end of the touch member is swung toward the base plate, the supporting frame is moved downwardly, and the second resilience arm is correspondingly swung toward the base plate by using the at least one second fixed point as a fulcrum. The first side and the second side of the touch member are two opposite sides of the touch member.

In an embodiment, when the external force is exerted on a third region of the touch member between the first region and the second region, the touch member is moved toward the base plate, so that the switch is contacted with the triggering part. While the touch member is swung toward the base plate, the supporting frame is moved downwardly, the first resilience arm is correspondingly swung toward the base plate by using the at least one first fixed point as the fulcrum, and the second resilience arm is correspondingly swung toward the base plate by using the at least one second fixed point as the fulcrum.

In an embodiment, the swingable resilience piece further comprises an intermediate plate, and the intermediate plate is connected between the first resilience arm and the second resilience arm. The intermediate plate has a hollow region. The triggering part of the base plate is exposed to the hollow region.

In an embodiment, the supporting frame comprises a first frame piece segment, a second frame piece segment, a third frame piece segment and a fourth frame piece segment. The first frame piece segment and the second frame piece segment are opposed to each other. The third frame piece segment and the fourth frame piece segment are opposed to each other. The third frame piece segment and the fourth segment are connected between the first frame piece segment and the second frame piece segment. The first resilience arm of the swingable resilience piece is connected with the first inner side of the third frame piece segment. The second resilience arm of the swingable resilience piece is connected with the second inner side of the fourth frame piece segment.

In an embodiment, the base plate includes two first position-limiting structures and two second position-limiting structures, and the two first position-limiting structures and the two second position-limiting structures are located at two opposite sides of the base plate. The first frame piece segment includes a first end part and a second end part. The second frame piece segment includes a third end part and a fourth end part. The first end part and the second end part are opposed to each other. The third end part and the fourth end part are opposed to each other. The first end part, the second end part, the third end part and the fourth end part are protruded outside the touch member. The first end part and the second end part are respectively contacted with the corresponding first position-limiting structures. The third end part and the fourth end part are respectively contacted with the corresponding second position-limiting structures.

In an embodiment, the touchpad module further includes at least one first fastening element and at least one second fastening element. The at least one first fastening element is tightened into the base plate at a position corresponding to the at least one first fixing point. The at least one second fastening element is tightened into the base plate at a position corresponding to the at least one second fixing point. Consequently, the swingable resilience piece is fixed on the base plate.

In an embodiment, the touch member includes a covering plate and a circuit board. The covering plate is located over the circuit board. The switch is installed on the circuit board.

In an embodiment, the touchpad module further includes a first adhesive layer and a second adhesive layer. The first adhesive layer is arranged between the covering plate and the circuit board. The second adhesive layer is arranged between the circuit board and the supporting frame.

In accordance with another aspect of the present invention, a computing device is provided. The computing device includes a casing, a processor and a touchpad module. A fixing frame is concavely formed in the casing. The processor is disposed within the casing. The touchpad module is disposed within the fixing frame and electrically connected with the processor. The touchpad module includes a base plate, a touch member and an elastic structure. The base plate includes a triggering part. The touch member is located over the base plate. The touch member includes a switch corresponding to the triggering part. The elastic structure is arranged between the touch member and the base plate. The elastic structure includes a supporting frame and a swingable resilience piece. The swingable resilience piece is connected with the supporting frame. The touch member is supported by the supporting frame. The swingable resilience piece is fixed on the base plate. There are at least one first fixing point and at least one second fixing point between the swingable resilience piece and the base plate. The swingable resilience piece includes a first resilience arm and a second resilience arm. The first resilience arm is extended from the at least one first fixing point in a direction toward the supporting frame and connected with a first inner side of the supporting frame. The second resilience arm is extended from the at least one second fixing point in a direction toward the supporting frame and connected with a second inner side of the supporting frame. When an external force is exerted on a first region at a first side of the touch member, a first end of the touch member is swung toward the base plate, so that the switch is contacted with the triggering part. While the first end of the touch member is swung toward the base plate, the supporting frame is moved downwardly, and the first resilience arm is correspondingly swung toward the base plate by using the at least one first fixed point as a fulcrum.

From the above descriptions, the structure of the touchpad module is specially designed. The whole region of the touch member of the touchpad module can be pressed down. Consequently, the problem of locally pressing the touch member of the conventional touchpad module can be overcome. Moreover, there are at least one first fixing point and at least one second fixing point between the swingable resilience piece and the base plate, and the first resilience arm and the second resilience arm are respectively connected with the first inner side and the second inner side of the supporting frame. When the first region or the second region of the touch member is pressed down, the supporting frame is correspondingly moved toward the base plate. Consequently, the first resilience arm is swung toward the base plate by using the first fixing point as the fulcrum, or the second resilience arm is swung toward the base plate by using the second fixed point as the fulcrum. Due to this structural design, the following benefits can be achieved. For example, while one end of the touch member is swung toward the base plate, the other end of the touch member will not have the same movement and stroke according to the seesaw principle. Since the unnecessary movement and stroke are largely reduced, the whole region of the touch member can be pressed down in response to the pressing force with the same magnitude and the switch can be triggered. In addition, while the touch member is swung, no abnormal noise is generated. Moreover, since the structural design of the touchpad module is simplified and the touch module is assembled easily, the fabricating cost and the overall weight of the touchpad module are reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
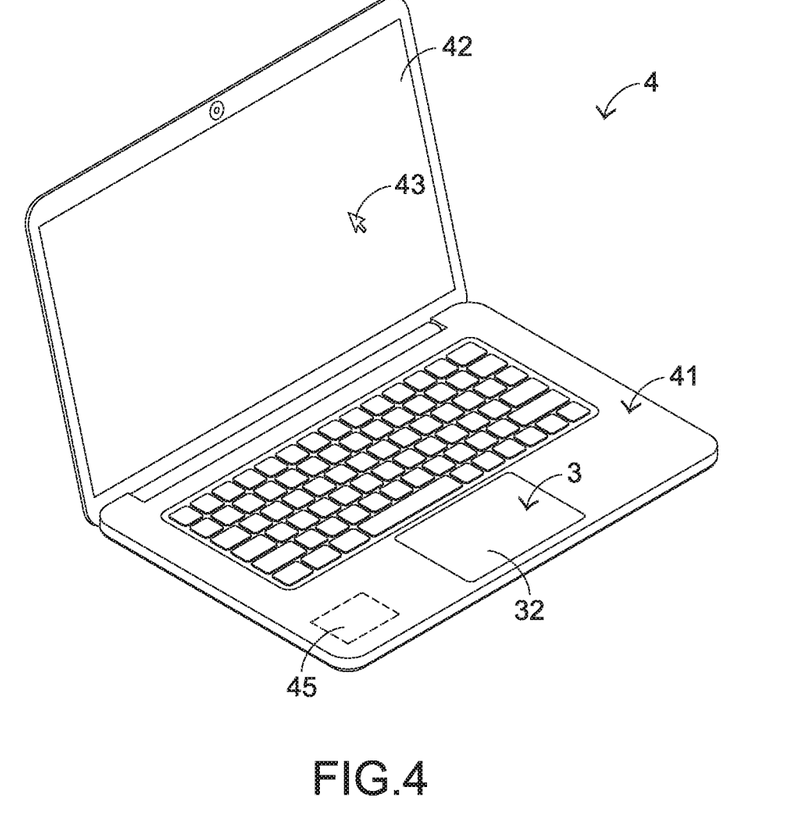
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. The processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 5:
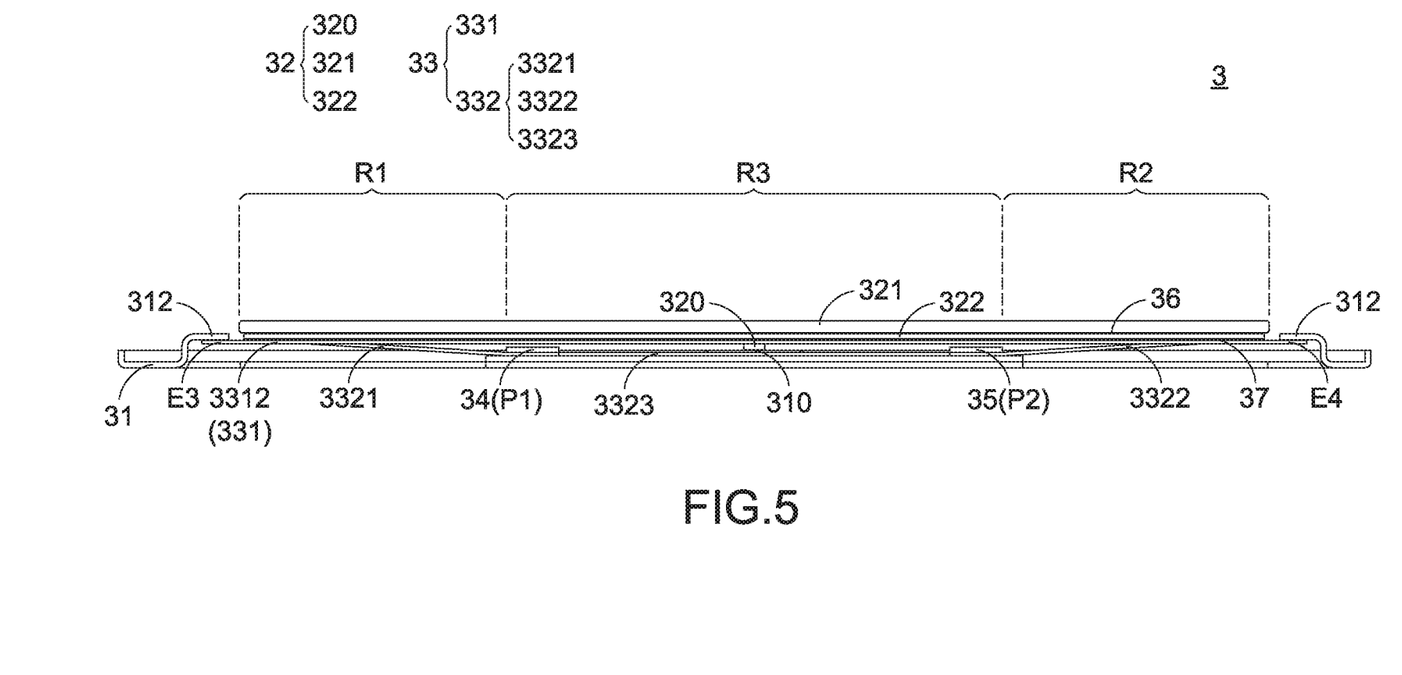
FIG. 5 is a schematic side view illustrating a portion of the touchpad module as shown in FIG. 4.
Figure 6:
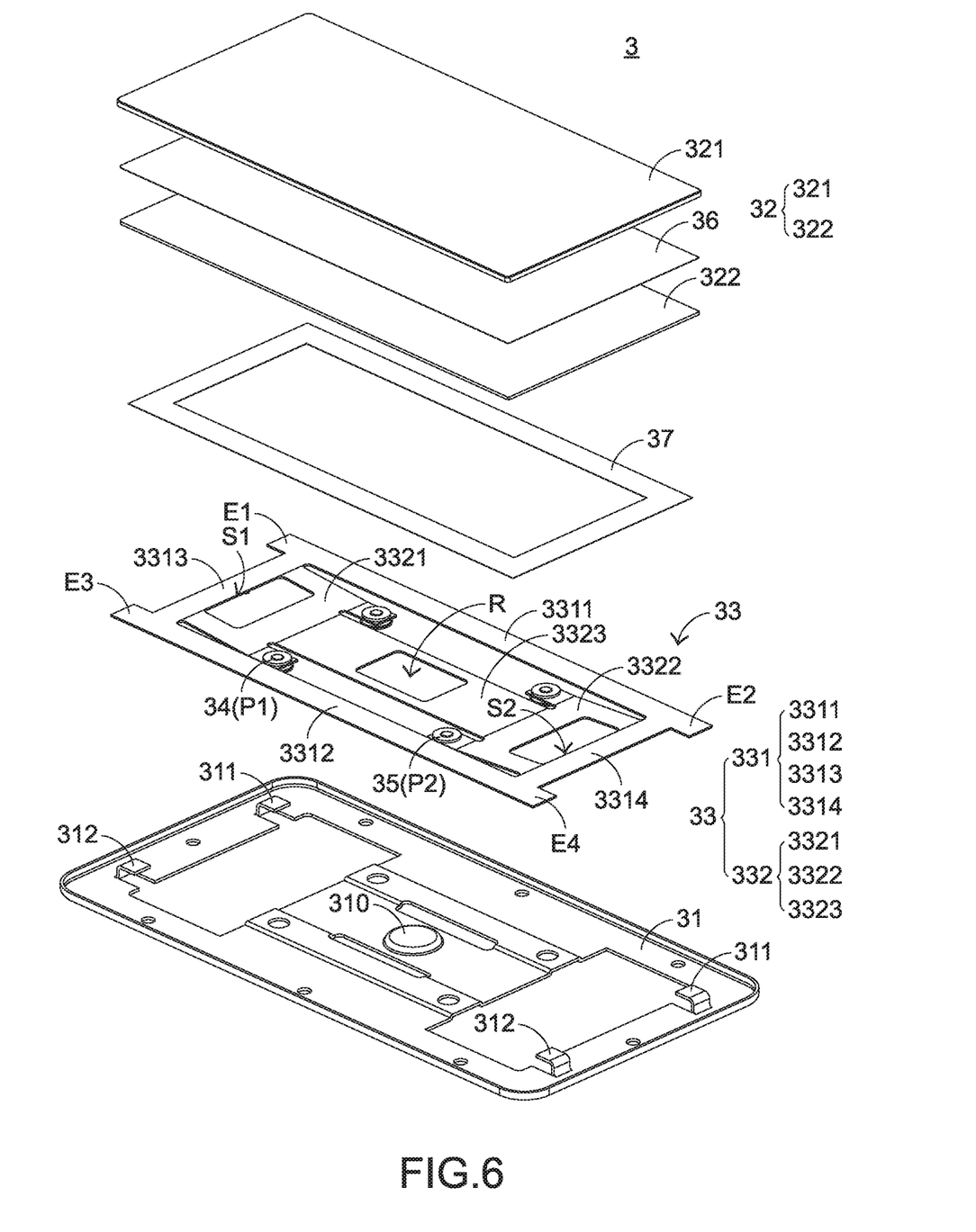
FIG. 6 is a schematic exploded view illustrating the touchpad module as shown in FIG. 5.
Figure 7:
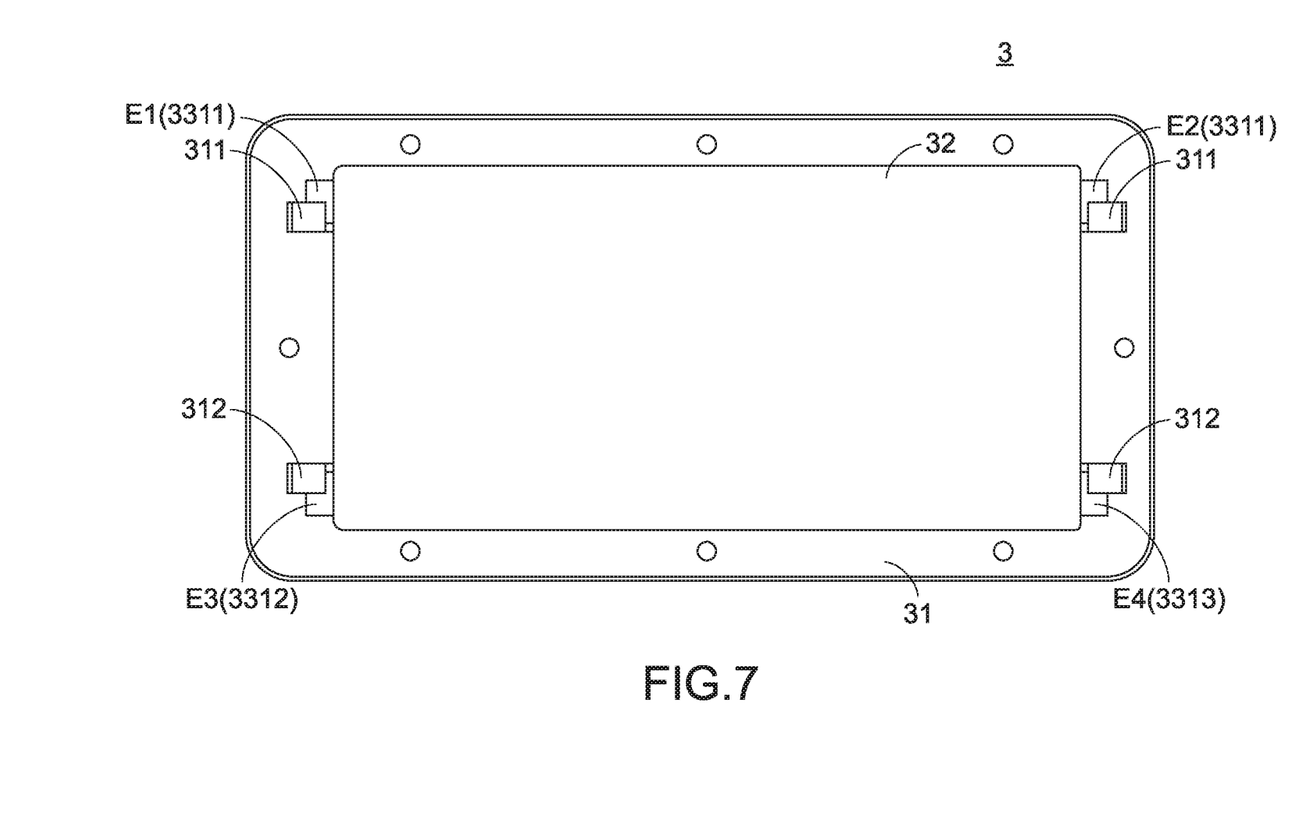
FIG. 7 is a schematic top view illustrating the touchpad module as shown in FIG. 5.
Figure 8:
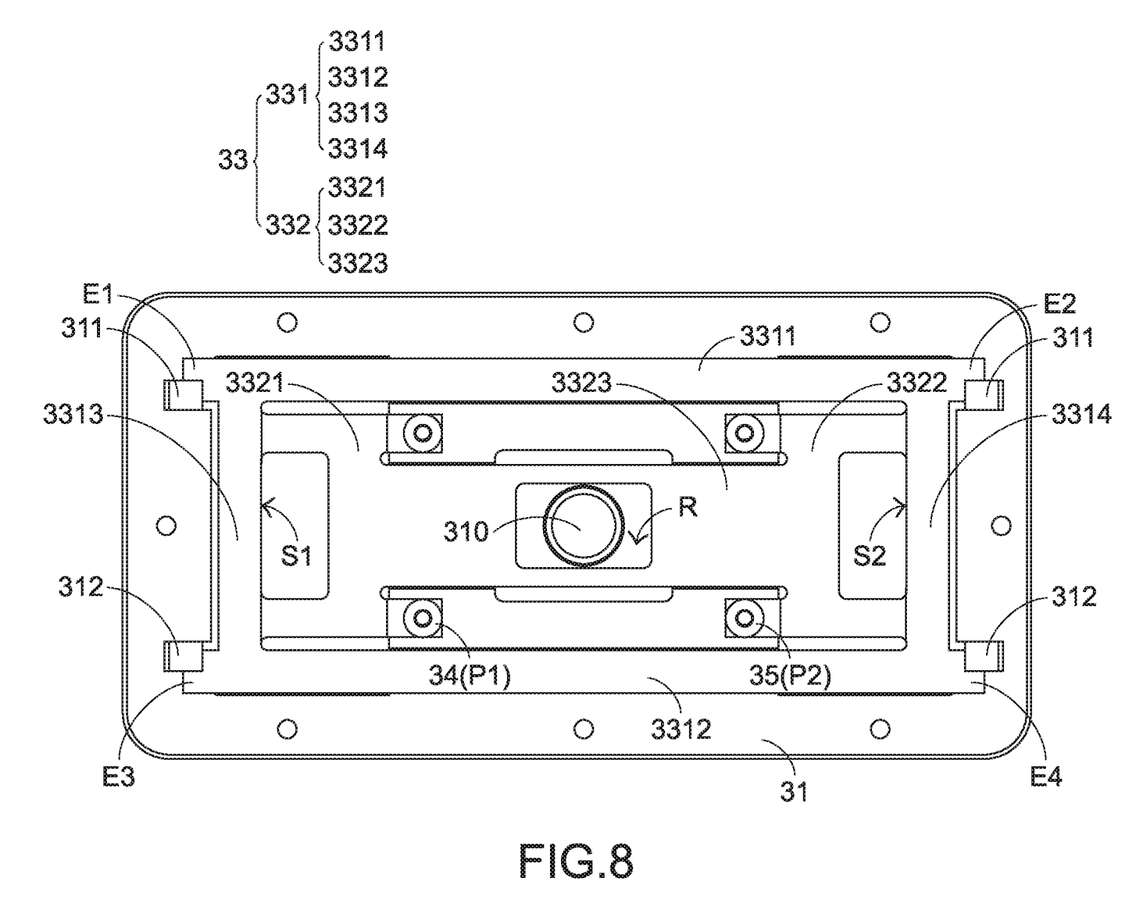
FIG. 8 is a schematic top view illustrating a portion of the touchpad module as shown in FIG. 5.

Please refer to FIGS. 5, 6, 7 and 8. FIG. 5 is a schematic side view illustrating a portion of the touchpad module as shown in FIG. 4. FIG. 6 is a schematic exploded view illustrating the touchpad module as shown in FIG. 5. FIG. 7 is a schematic top view illustrating the touchpad module as shown in FIG. 5. FIG. 8 is a schematic top view illustrating a portion of the touchpad module as shown in FIG. 5. For succinctness, the touch member 32, the first adhesive layer 36, the second adhesive layer 37 and some components in the touchpad module of FIG. 5 are not shown in FIG. 8.

Please refer to FIGS. 5, 6, 7 and 8. In an embodiment, the touchpad module 3 comprises a base plate 31, a touch member 32 and an elastic structure 33. The base plate 31 comprises a triggering part 310. The touch member 32 is located over the base plate 31. The touch member 32 comprises a switch 320 corresponding to the triggering part 310. The elastic structure 33 is arranged between the touch member 32 and the base plate 31. The elastic structure 33 comprises a supporting frame 331 and a swingable resilience piece 332. The swingable resilience piece 332 is connected with the supporting frame 331. Preferably but not exclusively, the top surface of the swingable resilience piece 332 is located at a level lower than the top surface of the supporting frame 331. The supporting frame 331 is used to support the touch member 32. The swingable resilience piece 332 is fixed on the base plate 31. In addition, there are at least one first fixing point P1 and at least one second fixing point P2 between the swingable resilience piece 332 and the base plate 31. The swingable resilience piece 332 comprises a first resilience arm 3321 and a second resilience arm 3322. The first resilience arm 3321 is extended from the first fixing point P1 in the direction toward the supporting frame 331 and connected with a first inner side S1 of the supporting frame 331. The second resilience arm 3322 is extended from the second fixing point P2 in the direction toward the supporting frame 331 and connected with a second inner side S2 of the supporting frame 331. The first inner side S1 and the second inner side S2 are opposed to each other.

In this embodiment, two first fixing points P1 are arranged between the swingable resilience piece 332 and the base plate 31, and two second fixing points P2 are arranged between the swingable resilience piece 332 and the base plate 31. It is noted that the numbers of the first fixing points P1 and the second fixing points P2 are not restricted. In addition, the touchpad module 3 further comprises two first fastening elements 34 and two second fastening elements 35. The first fastening elements 34 are tightened into the base plate 31 at the positions corresponding to the first fixing points P1. The second fastening elements 35 are tightened into the base plate 31 at the positions corresponding to the second fixing points P2. Consequently, the elastic structure 33 is fixed on the base plate 31 through the first fastening elements 34 and the second fastening elements 35. It is noted that the numbers of the first fastening element 34 and the second fastening elements 35 are not restricted. That is, the numbers of the first fastening elements and the second fastening elements may be increased or decreased according to the numbers of the first fixing points P1 and the second fixing points P2.

Please refer to FIGS. 5 and 6 again. In an embodiment, the touch member 32 comprises a covering plate 321 and a circuit board 322. The covering plate 321 is located over the circuit board 322. The switch 320 is installed on a bottom surface of the circuit board 322. The bottom surface of the circuit board 322 faces the base plate 31. Preferably but not exclusively, the covering plate 321 is made of glass or any other appropriate material. The material of the covering plate 321 may be varied according to the practical requirements. Preferably but not exclusively, the switch 33 is a metal dome.

Please refer to FIGS. 5 and 6 again. In an embodiment, the touchpad module 3 further comprises a first adhesive layer 36 and a second adhesive layer 37. The first adhesive layer 36 is arranged between the covering plate 321 and the circuit board 322 of the touch member 32. The covering plate 321 and the circuit board 322 are combined together through the first adhesive layer 36. The second adhesive layer 37 is arranged between the circuit board 322 of the touch member 32 and the supporting frame 331 of the elastic structure 33. The circuit board 322 and the supporting frame 311 are combined together through the second adhesive layer 37. Preferably but not exclusively, the first adhesive layer 36 and the second adhesive layer 37 are pressure sensitive adhesives (PSA). It is noted that the materials of the first adhesive layer 36 and the second adhesive layer 37 are not restricted.

Please refer to FIGS. 5, 6 and 8 again. In this embodiment, the swingable resilience piece 332 further comprises an intermediate plate 3323. The intermediate plate 3323 is connected between the first resilience arm 3321 and the second resilience arm 3323. The intermediate plate 3323 has a hollow region R. When the elastic structure 33 is fixed on the base plate 31, the triggering part 310 on the base plate 31 is exposed to the hollow region R of the intermediate plate 3323.

Please refer to FIGS. 5, 6 and 8 again. The supporting frame 331 comprises a first frame piece segment 3311, a second frame piece segment 3312, third frame piece segment 3313 and a fourth frame piece segment 3314. The first frame piece segment 3311 and the second frame piece segment 3312 are opposed to each other. The third frame piece segment 3313 and the fourth frame piece segment 3314 are opposed to each other. The third frame piece segment 3313 and the fourth segment 3314 are connected between the first frame piece segment 3311 and the second frame piece segment 3312. The first resilience arm 3321 of the swingable resilience piece 332 is connected with the first inner side 51 of the third frame piece segment 3313. The second resilience arm 3322 of the swingable resilience piece 332 is connected with the second inner side S2 of the fourth frame piece segment 3314.

Please refer to FIGS. 5, 6, 7 and 8 again. The base plate 31 further comprises two first position-limiting structures 311 and two second position-limiting structures 312. The first position-limiting structures 311 and the second position-limiting structures 312 are located at two opposite sides of the base plate 31. The first frame piece segment 3311 of the supporting frame 331 comprises a first end part E1 and a second end part E2, which are opposed to each other. The second frame piece segment 3312 of the supporting frame 331 comprises a third end part E3 and a fourth end part E4, which are opposed to each other. The first end part E1, the second end part E2, the third end part E3 and the fourth end part E4 are protruded outside the touch member 32. The first end part E1 and the second end part E2 of the first frame piece segment 3311 are respectively contacted with the corresponding first position-limiting structures 311. The third end part E3 and the fourth end part E4 of the second frame piece segment 3312 are respectively contacted with the corresponding second position-limiting structures 312. Preferably but not exclusively, the first position-limiting structures 311 and the second position-limiting structures 312 are hooks that are protruded from the base plate 31. In an embodiment, the base plate 31 is made of metallic material or any other appropriate material.

The operations of the touchpad module 3 will be described in more details as follows.

Please refer to FIGS. 5, 6, 7 and 8 again. When an external force is exerted on a first region R1 of the touch member 32, a first end of the touch member 32 is swung in a direction toward the base plate 31. Consequently, the switch 320 on the touch member 32 is contacted with the triggering part 310 on the base plate 31. While the first end of the touch member 32 is swung toward the base plate 31, the supporting frame 331 is correspondingly moved toward the base plate 31. As mentioned above, the first resilience arm 3321 is connected with the first inner side S1 of the supporting frame 331. Consequently, while the supporting frame 331 is moved toward the base plate 31, the first resilience arm 3321 of the swingable resilience piece 332 is correspondingly moved toward the base plate 31. That is, the first resilience arm 3321 of the swingable resilience piece 332 is swung in the direction toward the base plate 31 by using the first fixing point P1 as the fulcrum. Moreover, while the supporting frame 331 is correspondingly moved with the touch member 32 in the direction toward the base plate 31, the first end part E1 of the first frame piece segment 3311 and the third end part E3 of the second frame piece segment 3312 in the supporting frame 331 are respectively detached from the first position-limiting structures 311 and the second position-limiting structures 312 at the left side of the base plate 31. In other words, while the supporting frame 331 is moved, the first end part E1 of the first frame piece segment 3311 and the third end part E3 of the second frame piece segment 3312 are moved in the space between the first position-limiting structure 311 and the second position-limiting structure 312 at the left side of the base plate 31.

As shown in FIGS. 5, 6, 7 and 8, the first region R1 is located at a first side of the touch member 32. Moreover, a second region R2 is located at a second side of the touch member 32. When an external force is exerted on the second region R2 of the touch member 32, a second end of the touch member 32 is swung toward the base plate 31. Consequently, the switch 320 on the touch member 32 is contacted with the triggering part 310 on the base plate 31. While the second end of the touch member 32 is swung toward the base plate 31, the supporting frame 331 is correspondingly moved toward the base plate 31. As mentioned above, the second resilience arm 3322 is connected with the second inner side S2 of the supporting frame 331. Consequently, while the supporting frame 331 is moved toward the base plate 31, the second resilience arm 3322 of the swingable resilience piece 332 is correspondingly moved toward the base plate 31. That is, the second resilience arm 3322 of the swingable resilience piece 332 is swung in the direction toward the base plate 31 by using the second fixed point P2 as the fulcrum. Moreover, while the supporting frame 331 is correspondingly moved with the touch member 32 in the direction toward the base plate 31, the second end part E2 of the first frame piece segment 3311 of the supporting frame 331 and the fourth end part E4 of the second frame piece segment 3312 in the supporting frame 331 are respectively detached from the first position-limiting structures 311 and the second position-limiting structures 312 at the right side of the base plate 31. In other words, while the supporting frame 331 is moved, the second end part E2 of the first frame piece segment 3311 of the supporting frame 331 and the fourth end part E4 of the second frame piece segment 3312 are moved in the space between the first position-limiting structure 311 and the second position-limiting structure 312 at the right side of the base plate 31.

As shown in FIGS. 5, 6, 7 and 8, a third region R3 of the touch member 32 is arranged between the first region R1 and the second region R2. When an external force is exerted on the third region R3 of the touch member 32, the touch member 32 is moved toward the base plate 31. Consequently, the switch 320 on the touch member 32 is contacted with the triggering part 310 on the base plate 31. While a middle region of the touch member 32 is swung toward the base plate 31, the supporting frame 331 is correspondingly moved toward the base plate 31. As mentioned above, the first resilience arm 3321 is connected with the first inner side S1 of the supporting frame 331, and the second resilience arm 3322 is connected with the second inner side S2 of the supporting frame 331. Consequently, while the supporting frame 331 is moved toward the base plate 31, the first resilience arm 3321 and the second resilience arm 3322 of the swingable resilience piece 332 are correspondingly moved toward the base plate 31. That is, the first resilience arm 3321 of the swingable resilience piece 332 is swung in the direction toward the base plate 31 by using the first fixing point P1 as the fulcrum, and the second resilience arm 3322 of the swingable resilience piece 332 is swung in the direction toward the base plate 31 by using the second fixed point P2 as the fulcrum. Moreover, while the supporting frame 331 is correspondingly moved with the touch member 32 in the direction toward the base plate 31, the first end part E1 of the first frame piece segment 3311 and the third end part E3 of the second frame piece segment 3312 are respectively detached from the first position-limiting structures 311 and the second position-limiting structures 312 at the left side of the base plate 31, and the second end part E2 of the first frame piece segment 3311 of the supporting frame 331 and the fourth end part E4 of the second frame piece segment 3312 are respectively detached from the first position-limiting structures 311 and the second position-limiting structures 312 at the right side of the base plate 31.

As mentioned above, the intermediate plate 3323 of the swingable resilience piece 332 is connected between the first frame piece segment 3321 and the second resilience arm 3322. Consequently, while the first resilience arm 3321 of the swingable resilience piece 332 is swung toward the base plate 31 by using the first fixed points P1 as the fulcrum, an action force (i.e., a restoring force) in the direction away from the base plate 31 is generated and applied to the intermediate plate 3323 of the swingable resilience piece 332. In response to the restoring force, the intermediate plate 3323 is slightly upturned. That is, while the first resilience arm 3321 is swung, the generated reaction force is absorbed by the intermediate 3323. Consequently, the action forces applied to the first fastening elements 34, which are tightened into the base plate 31 at the positions corresponding to the first fixing points P1, are dispersed. In this way, even if the first resilience arm 3321 is frequently swung upwardly or downwardly, the first fastening elements 34 are not detached from the first fixing points P1.

Similarly, while the second resilience arm 3322 of the swingable resilience piece 332 is swung toward the base plate 31 by using the second fixed points P2 as the fulcrum, an action force (i.e., a restoring force) in the direction away from the base plate 31 is generated and applied to the intermediate plate 3323 of the swingable resilience piece 332. In response to the restoring force, the intermediate plate 3323 is slightly upturned. That is, while the first resilience arm 3321 is swung, the generated reaction force is absorbed by the intermediate 3323. Consequently, the action forces applied to the second fastening elements 35, which are tightened into the base plate 31 at the positions corresponding to the second fixed points P2, are dispersed. In this way, even if the second resilience arm 3322 is frequently swung upwardly or downwardly, the second fastening elements 35 are not detached from the second fixed points P2.

Especially, the position of the first fixed point P1 between the swingable resilience piece 332 and the base plate 31 may be varied according to the practical requirement. For example, the first fixed point P1 is located at the position close to the third frame piece segment 3313 of the supporting frame 331 or away from the third frame piece segment 3313 of the supporting frame 331. Similarly, the position of the second fixed point P2 between the swingable resilience piece 332 and the base plate 31 may be varied according to the practical requirement. For example, the second fixed point P2 is located at the position close to the fourth frame piece segment 3314 of the supporting frame 331 or away from the fourth frame piece segment 3314 of the supporting frame 331. Consequently, the tactile feel of depressing the touchpad module 3 is adjustable. That is, the magnitude of pressing down the touch member 32 by the user can be adjusted.

From the above descriptions, the structure of the touchpad module is specially designed. The whole region of the touch member of the touchpad module can be pressed down. Consequently, the problem of locally pressing the touch member of the conventional touchpad module can be overcome. Moreover, there are at least one first fixing point and at least one second fixing point between the swingable resilience piece and the base plate, and the first resilience arm and the second resilience arm are respectively connected with the first inner side and the second inner side of the supporting frame. When the first region or the second region of the touch member is pressed down, the supporting frame is correspondingly moved toward the base plate. Consequently, the first resilience arm is swung toward the base plate by using the first fixing point as the fulcrum, or the second resilience arm is swung toward the base plate by using the second fixed point as the fulcrum. Due to this structural design, the following benefits can be achieved. For example, while one end of the touch member is swung toward the base plate, the other end of the touch member will not have the same movement and stroke according to the seesaw principle. Since the unnecessary movement and stroke are largely reduced, the whole region of the touch member can be pressed down in response to the pressing force with the same magnitude and the switch can be triggered. In addition, while the touch member is swung, no abnormal noise is generated. Moreover, since the structural design of the touchpad module is simplified and the touch module is assembled easily, the fabricating cost and the overall weight of the touchpad module are reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of a computing device, the touchpad module comprising:
 a base plate comprising a triggering part;
 a touch member located over the base plate, wherein the touch member comprises a switch corresponding to the triggering part; and an elastic structure arranged between the touch member and the base plate, and comprising:
  a supporting frame and a swingable resilience piece, wherein the swingable resilience piece is connected with the supporting frame, and the touch member is supported by the supporting frame, wherein the swingable resilience piece is fixed on the base plate,
  wherein there are at least one first fixing point and at least one second fixing point between the swingable resilience piece and the base plate, and
  wherein the swingable resilience piece comprises a first resilience arm and a second resilience arm, wherein the first resilience arm is extended from the at least one first fixing point in a direction toward the supporting frame and connected with a first inner side of the supporting frame, and the second resilience arm is extended from the at least one second fixing point in a direction toward the supporting frame and connected with a second inner side of the supporting frame,
wherein when an external force is exerted on a first region at a first side of the touch member, a first end of the touch member is swung toward the base plate, so that the switch is contacted with the triggering part,
wherein while the first end of the touch member is swung toward the base plate, the supporting frame is moved downwardly, and the first resilience arm is correspondingly swung toward the base plate by using the at least one first fixed point as a fulcrum,
wherein when the external force is exerted on a second region at a second side of the touch member, a second end of the touch member is swung toward the base plate, so that the switch is contacted with the triggering part,
wherein while the second end of the touch member is swung toward the base plate, the supporting frame is moved downwardly, and the second resilience arm is correspondingly swung toward the base plate by using the at least one second fixed point as a fulcrum,
wherein the first side and the second side of the touch member are two opposite sides of the touch member.

2. The touchpad module according to claim 1, wherein when the external force is exerted on a third region of the touch member between the first region and the second region, the touch member is moved toward the base plate, so that the switch is contacted with the triggering part, wherein while the touch member is swung toward the base plate, the supporting frame is moved downwardly, the first resilience arm is correspondingly swung toward the base plate by using the at least one first fixed point as the fulcrum, and the second resilience arm is correspondingly swung toward the base plate by using the at least one second fixed point as the fulcrum.

3. The touchpad module according to claim 1, wherein the swingable resilience piece further comprises an intermediate plate, and the intermediate plate is connected between the first resilience arm and the second resilience arm, wherein the intermediate plate has a hollow region, and the triggering part of the base plate is exposed to the hollow region.

4. The touchpad module according to claim 1, wherein the supporting frame comprises a first frame piece segment, a second frame piece segment, a third frame piece segment and a fourth frame piece segment, wherein the first frame piece segment and the second frame piece segment are opposed to each other, the third frame piece segment and the fourth frame piece segment are opposed to each other, and the third frame piece segment and the fourth segment are connected between the first frame piece segment and the second frame piece segment, wherein the first resilience arm of the swingable resilience piece is connected with the first inner side of the third frame piece segment, and the second resilience arm of the swingable resilience piece is connected with the second inner side of the fourth frame piece segment.

5. The touchpad module according to claim 4, wherein the base plate comprises two first position-limiting structures and two second position-limiting structures, and the two first position-limiting structures and the two second position-limiting structures are located at two opposite sides of the base plate, wherein the first frame piece segment comprises a first end part and a second end part, and the second frame piece segment comprises a third end part and a fourth end part, wherein the first end part and the second end part are opposed to each other, the third end part and the fourth end part are opposed to each other, and the first end part, the second end part, the third end part and the fourth end part are protruded outside the touch member, wherein the first end part and the second end part are respectively contacted with the corresponding first position-limiting structures, and the third end part and the fourth end part are respectively contacted with the corresponding second position-limiting structures.

6. The touchpad module according to claim 1, wherein the touchpad module further comprises at least one first fastening element and at least one second fastening element, wherein the at least one first fastening element is tightened into the base plate at a position corresponding to the at least one first fixing point, and the at least one second fastening element is tightened into the base plate at a position corresponding to the at least one second fixing point, so that the swingable resilience piece is fixed on the base plate.

7. The touchpad module according to claim 1, wherein the touch member comprises a covering plate and a circuit board, wherein the covering plate is located over the circuit board, and the switch is installed on the circuit board.

8. The touchpad module according to claim 7, wherein the touchpad module further comprises a first adhesive layer and a second adhesive layer, wherein the first adhesive layer is arranged between the covering plate and the circuit board, and the second adhesive layer is arranged between the circuit board and the supporting frame.

9. A computing device, comprising:
  a casing, wherein a fixing frame is concavely formed in the casing;
  a processor disposed within the casing; and
  a touchpad module disposed within the fixing frame and electrically connected with the processor, wherein the touchpad module comprises:
    a base plate comprising a triggering part;
    a touch member located over the base plate, wherein the touch member comprises a switch corresponding to the triggering part; and
    an elastic structure arranged between the touch member and the base plate, and comprising,
      a supporting frame and a swingable resilience piece, wherein the swingable resilience piece is connected with the supporting frame, and the touch member is supported by the supporting frame, wherein the swingable resilience piece is fixed on the base plate,
      wherein there are at least one first fixing point and at least one second fixing point between the swingable resilience piece and the base plate, and
      wherein the swingable resilience piece comprises a first resilience arm and a second resilience arm, wherein the first resilience arm is extended from the at least one first fixing point in a direction toward the supporting frame and connected with a first inner side of the supporting frame, and the second resilience arm is extended from the at least one second fixing point in a direction toward the supporting frame and connected with a second inner side of the supporting frame, wherein when an external force is exerted on a first region at a first side of the touch member, a first end of the touch member is swung toward the base plate, so that the switch is contacted with the triggering part, wherein while the first end of the touch member is swung toward the base plate, the supporting frame is moved downwardly, and the first resilience arm is correspondingly swung toward the base plate by using the at least one first fixed point as a fulcrum, wherein when the external force is exerted on a second region at a second side of the touch member, a second end of the touch member is swung toward the base plate, so that the switch is contacted with the triggering part, wherein while the second end of the touch member is swung toward the base plate, the supporting frame is moved downwardly, and the second resilience arm is correspondingly swung toward the base plate by using the at least one second fixed point as a fulcrum, wherein the first side and the second side of the touch member are two opposite sides of the touch member.

\* \* \* \* \*